April 27, 1937.  S. J. NORDSTROM  2,078,271
PLUG VALVE
Filed Nov. 28, 1931  4 Sheets-Sheet 1
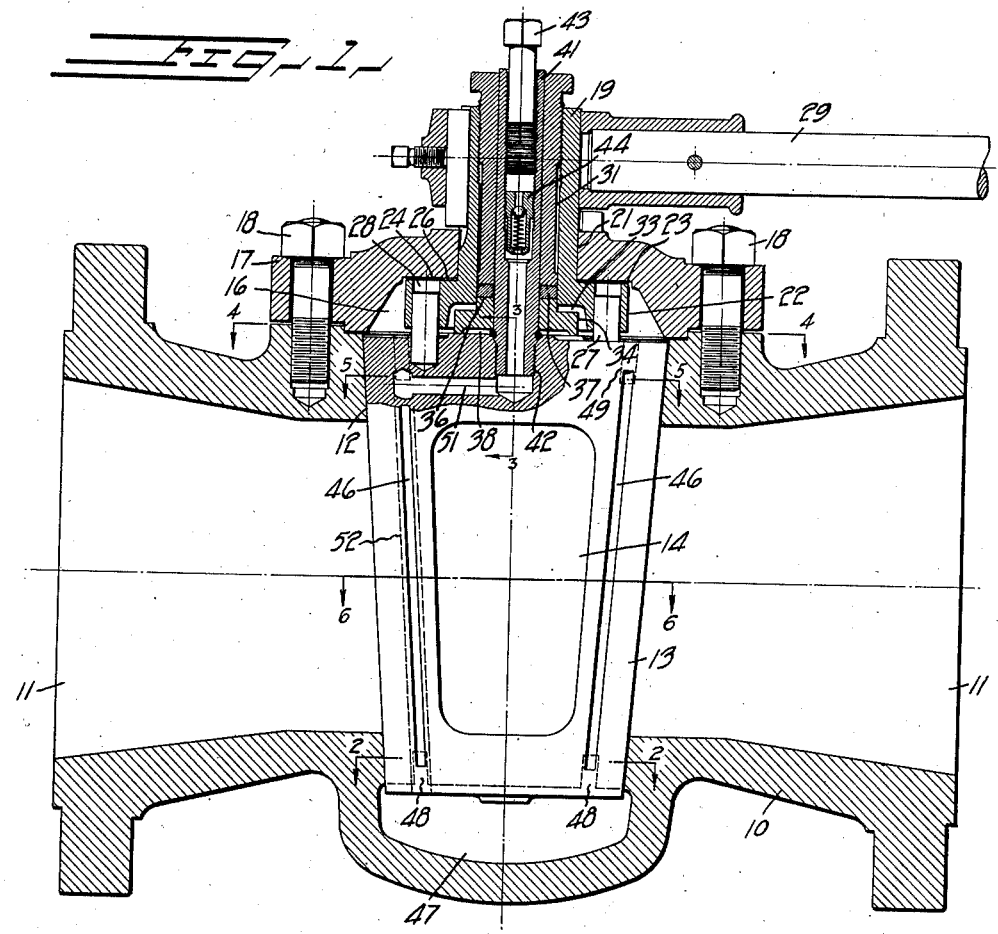
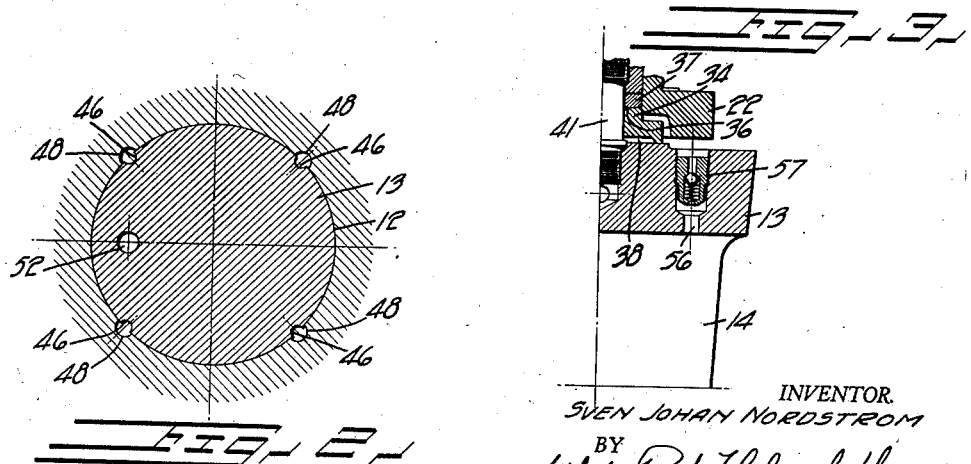
INVENTOR.
SVEN JOHAN NORDSTROM
BY
White, Prost, Flehr & Lothrop
ATTORNEYS.

April 27, 1937.  S. J. NORDSTROM  2,078,271
PLUG VALVE
Filed Nov. 28, 1931  4 Sheets-Sheet 2

INVENTOR.
SVEN JOHAN NORDSTROM
BY
ATTORNEYS.

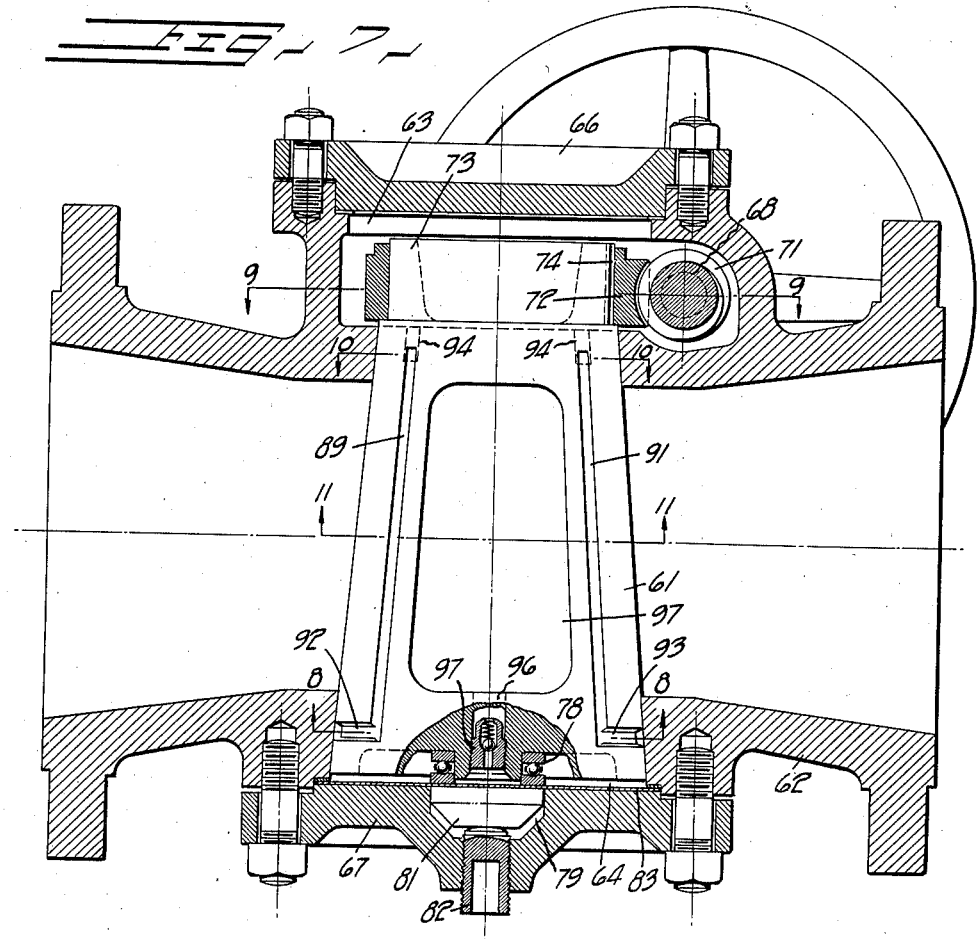
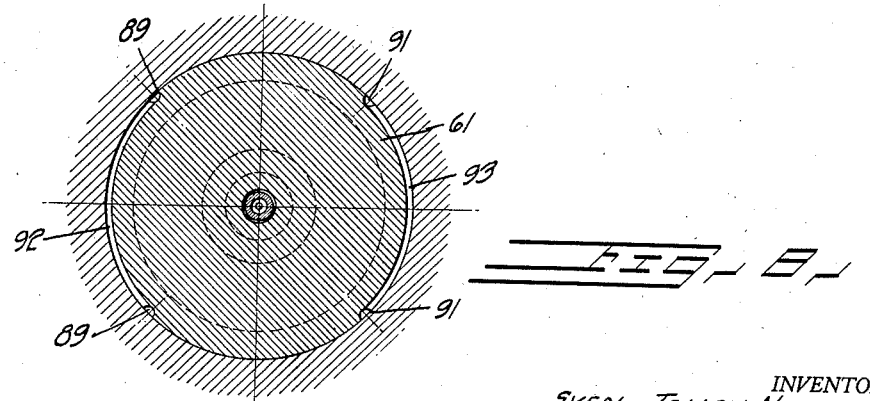

April 27, 1937.   S. J. NORDSTROM   2,078,271
PLUG VALVE
Filed Nov. 28, 1931   4 Sheets-Sheet 4
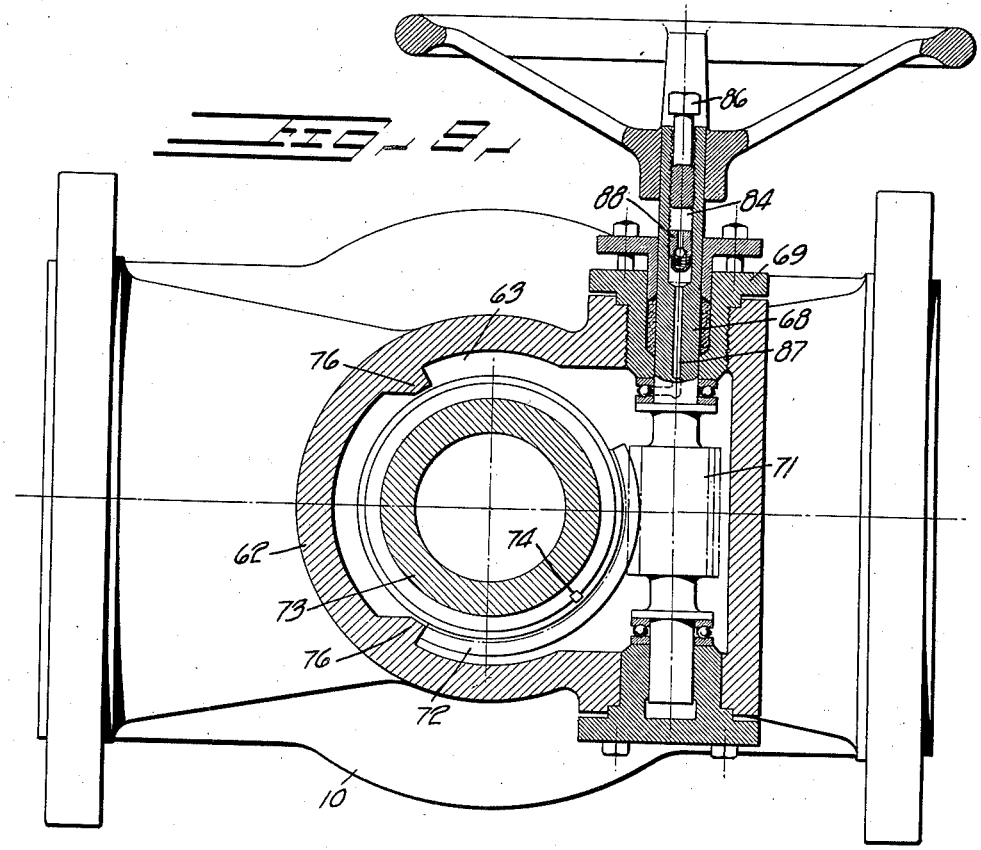
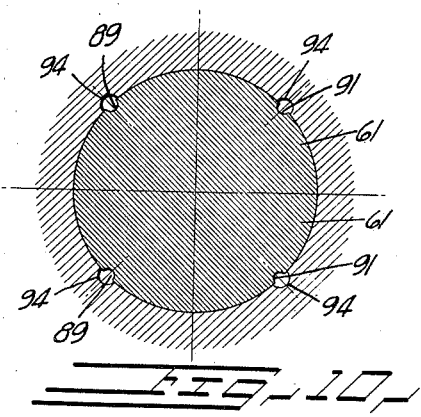
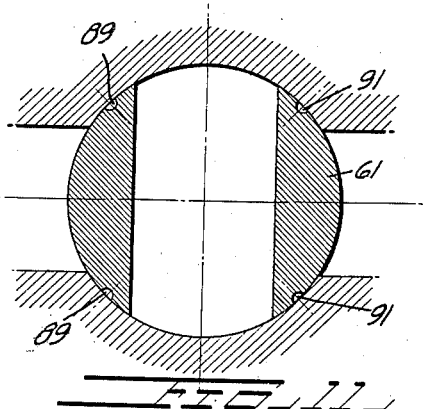
INVENTOR.
SVEN JOHAN NORDSTROM
BY
ATTORNEYS.

Patented Apr. 27, 1937

2,078,271

UNITED STATES PATENT OFFICE 2,078,271

PLUG VALVE

Sven Johan Nordstrom, Piedmont, Calif., assignor to Merco Nordstrom Valve Company, San Francisco, Calif., a corporation of Delaware Application November 28, 1931, Serial No. 577,732

8 Claims. (Cl. 251—93)

This invention relates generally to valves of the rotatable plug type, particularly those provided with pressure lubrication.

Many pressure lubricated plug valves are so constructed that a closed chamber is formed at the large end of the plug. In the operation of such valves on high pressure lines it has been observed that if the pressure in the line is suddenly released, the plug is firmly forced into its seat and is difficult to turn. It has been found that this is due to fluid pressure trapped in the chamber at the large end of the plug, and which cannot immediately escape when the line pressure is suddenly reduced. Frequently the force of such trapped fluid pressure is so great that if the plug is to be immediately operated, it must first be jacked from its seat. It is an object of the present invention to devise a plug valve of such a character that, although it is provided with a chamber at the large end of the plug, relatively high fluid pressure cannot be trapped in this chamber when the line pressure is suddenly released.

It is a further object of the invention to provide for the escapement of any undue amount of lubricant which may find its way into the chamber at the large end of the plug.

A further object of the invention is to devise an improved form of plug valve capable of successful operation under relatively high line pressures.

Further objects of the invention will appear from the following description in which the preferred embodiments of the invention have been set forth in detail in conjunction with the accompanying drawings. It is to be understood that the appended claims are to be accorded a range of equivalents consistent with the state of the prior art.

Referring to the drawings:

Fig. 1 is a side elevational view, in cross section, illustrating a valve incorporating the present invention.

Fig. 2 is a cross sectional detail taken along the line 2—2 of Fig. 1.

Fig. 3 is a cross sectional detail taken along the line 3—3 of Fig. 1.

Fig. 7 is a side elevational view, in cross section, illustrating a modification of the present invention.

Fig. 8 is a cross sectional detail taken along the line 8—8 of Fig. 7.

Fig. 9 is a cross sectional detail taken along the line 9—9 of Fig. 7.

Figure 4:
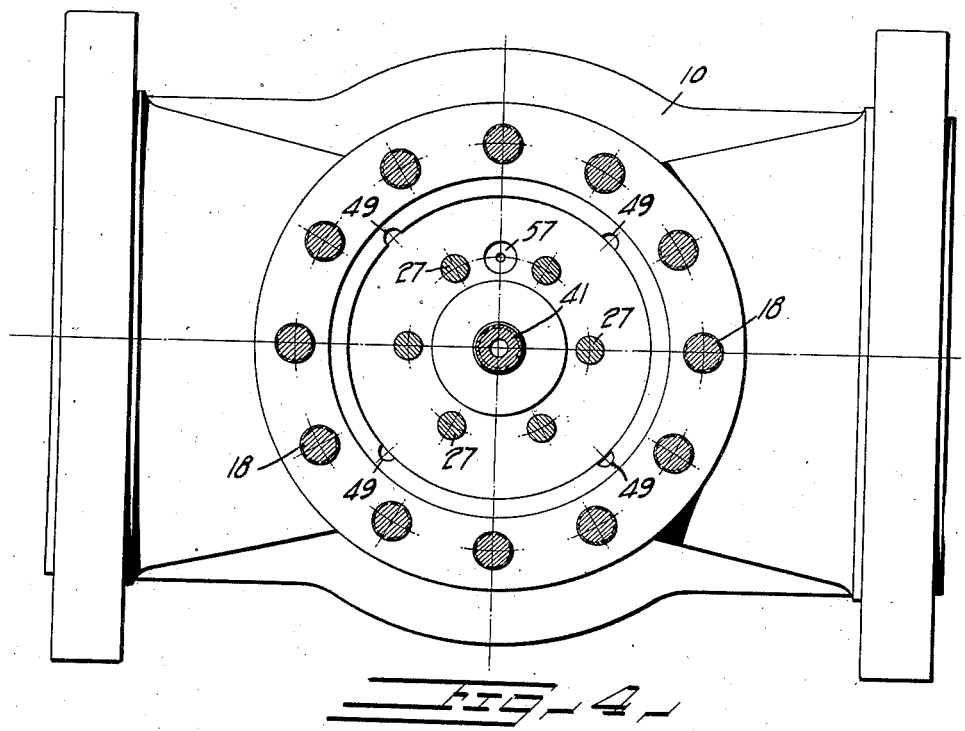
Fig. 4 is a cross sectional detail taken along line 4—4 of Fig. 1.

Figs. 10 and 11 are cross sectional details taken along the lines 10—10 and 11—11, respectively, of Fig. 7.

The valve illustrated in Figs. 1 to 6 inclusive includes a casing 10 having a passageway 11 therethrough for flow of fluid. This casing is also formed to provide a tapered or conical shaped seat 12, within which a conical shaped plug 13 is disposed. Plug 13 is provided with a hole 14 adapted to register with passageway 11 for open position of the valve.

At the large end of the plug there is a chamber 16 which is defined in part by the cover plate 17. This cover plate is secured to the main part of the casing by suitable means such as cap screws 18. As means to effect rotation of plug 13, there is shown a hollow head 19, extending through a bore 21 formed centrally of cover plate 17. The other end of hollow head 19 is provided with an annular portion 22 of enlarged diameter, which affords an annular surface 23 in opposed relationship with respect to an annular surface 24 formed upon the inner face of cover plate 17. Interposed between surfaces 23 and 24, there is a gasket 26 made of suitable material, such as sheet metal. To form a driving connection between the inner end of head 19 and plug 13, a plurality of circumferentially spaced pins 27 are fixed to the large end of plug 13, and these pins are loosely received in apertures 28 formed in the enlarged annular portion 22. An operating handle 29 is shown fixed to the outer end of head 19.

To provide means for yieldingly urging the plug into its seat, I provide a sleeve 31 which is threaded into the hollow head 19. The inner end of hollow head 19 is provided with an annular recess 33, which receives an annular member 34 made of resilient metal which will take considerable stress without permanent deformation. Interposed between a raised annular shoulder 36 formed upon member 34 and the inner end of sleeve 31, there is an annular bearing member or packing ring 37 which is preferably metallic, or of some semi-metallic material, which will afford substantially no resiliency when under high pressure. The face of member 34 adjacent the large end of plug 13 is recessed as indicated at 38, to enable a certain amount of deformation within its elastic limit, when a thrust is applied to the shoulder 36 by sleeve 31 and packing 37. The valve of Fig. 1 is also provided with a pressure lubricating system, which includes a tube 41 extending through sleeve 31, and having its inner end threaded into a bore 42 provided in the large end of the plug. A pressure screw 43 is threaded into tube 41, and a check valve 44 is also provided within this tube to prevent back flow of lubricant.

Figure 5:
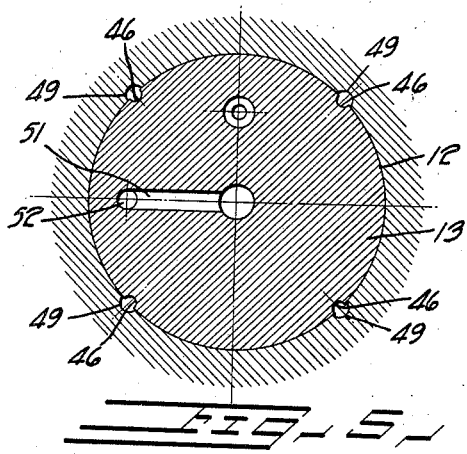
Fig. 5 is a cross sectional detail taken along the line 5—5 Fig. 1.
Figure 6:
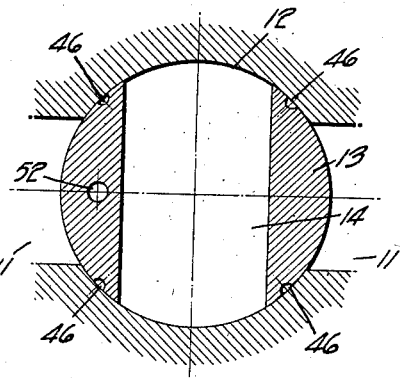
Fig. 6 is a cross sectional detail taken along the line 6—6 of Fig. 1.

In order to supply lubricant from bore 42 to the valve working surfaces, the periphery of plug 13 is shown provided with four longitudinal lubricant channels 46, the ends of which terminate short of the upper and lower edges of the valve working surfaces. By the term "valve working surfaces" is meant the surfaces in contact between the casing and the periphery of the plug which effect sealing. Formed within the casing at the small end of the plug, there is a closed lubricant chamber 47. For open and closed positions, the chamber 47 is in communication with longitudinal grooves 46, through four branch channels 48, formed in the valve casing and interrupting the lower portion of the seating surface. (Fig. 2.) Likewise, branch channels 49 interrupt the valve seat adjacent the large end of the plug, and serve to establish communication between the longitudinal channels 46 and chamber 16, for open and closed positions of the plug. (Fig. 5.) Communication is established between bore 42 and chamber 47, by the radial duct 51 and longitudinal duct 52. These ducts are formed within the plug and do not interrupt the valve working surfaces.

It may be explained at this point that the valve just described is intended to be lubricated with a relatively viscous lubricant, such as is commonly utilized with lubricated plug valves, and which is available upon the market in stick form. Assuming that such a lubricant is fed into the valve through tube 41, and caused to fill chamber 47, application of pressure to the lubricant by turning down screw 43 causes this lubricant (if the valve is in either open or closed position) to flow through longitudinal channels 46, and from these channels into chamber 16 through connecting channels 49. Channels 46 and 49 are preferably so dimensioned as to offer considerable resistance to the flow of viscous lubricant. In other words, these channels serve as pressure attenuating means so that there is a lag in the lubricant pressure developed in chamber 16 behind that developed in chamber 47 at the time of turning down screw 43. In this connection chamber 47 can be termed a "primary lubricant chamber", and the lubricant pressure developed in the same termed a "primary pressure", while chamber 16 can be termed a "secondary chamber", and the pressure within the same termed a "secondary pressure". Since there is a gradation of fluid pressure in channels 46 at the time of lubricant flow through the system, it is also proper to term the lubricant pressure in these channels a "secondary pressure" and the pressure in chamber 16 a "tertiary pressure". In any event the attenuation of pressure of lubricant flowing to chamber 16 is such that by turning down screw 43, sufficient pressure can be developed in chamber 47, as compared to the relatively low corresponding pressure in chamber 16, to enable jacking of the plug from its seat.

It may also be explained with respect to the valve described, that the maintenance of lubricant in chamber 16 serves as an effective seal and lubrication for the surfaces in contact between the enlarged inner end portion 22 and the cover plate 17, and also serves to effect efficient sealing by packing ring 37 to prevent leakage between sleeve 31 and head 19, and between sleeve 31 and the inner lubrication tube 41.

When the valve described above is used on a relatively high pressure line, the ends of the plug will inevitably be subjected to line pressure, by seepage of line fluid past the ends of the plug into chambers 16 and 47. If the line pressure is suddenly reduced to say atmospheric and if such pressure is trapped within chamber 16, it is evident that such trapped pressure would tend to hold the plug into its seat, to make turning temporarily difficult. To enable venting of chamber 16 under such conditions, I form plug 13 with a port 56 as shown in Fig. 3, which connects chamber 16 with the hole 14 through the plug. Port 56 is preferably controlled by a suitable check valve 57, as for example a check valve of the spring pressed ball type. Check valve 57 will prevent entrance of line fluid into chamber 16, but in the event it should happen that the pressure in chamber 16 is substantially greater than the pressure in port 14 and in the line, check valve 57 will be opened by fluid pressure and permit fluid in chamber 16 to vent into port 14. With such a construction it is evident that the pressure in chamber 16 can never be less than line pressure, and can be greater than line pressure only by an amount sufficient to effect opening of the check valve. Port 56 and check valve 57 may also serve to permit escapement of lubricant from chamber 16 in the event that an excess of lubricant is supplied to this chamber from the lubricating system for the valve.

In the modification ilustrated in Figs. 7 to 11 inclusive, the invention has been shown incorporated with a valve having a gear operator. In this case the conical plug 61 has both its ends terminating entirely within the casing 62, and the casing is formed to provide chambers 63 and 64 at the small and large ends of the plug respectively. Chambers 63 and 64 are defined in part by the cover plates 66 and 67, the cover plate 67 being formed resiliently, as for example a steel forging or a steel casting. A rotatable operating shaft 68 extends into the casing with its axis at right angle to the longitudinal axis of plug 61, and leakage between this shaft and the casing is prevented by a suitable packing gland 69. The inner portion of operating shaft 68 is provided with a worm 71, engaging with a segmental worm gear 72. Segmental worm gear 72 is in the form of a ring, which is slipped over an annular flange 73 formed on the small end of the plug, and secured thereto to form a driving connection, as by means of key 74. Space lugs 76, formed as a part of the casing serve to engage the ends of the toothed portion of worm gear 72 and thus limit rotation of the plug to 90°. For yieldingly holding the plug 61 into its seat, means is provided including a thrust bearing 78, which engages the large end of the plug, and which can be of the ball type in order to afford a minimum of friction. The inner face of cover plate 67 is provided with a recess 79, in which a thrust block 81 is fitted. A screw 82 is threaded into cover plate 67, and has its inner end engaging thrust block 81. Interposed between the inner end of thrust block 81 and thrust bearing 78, there is a diaphragm 83 made of suitable material such as thin sheet metal, the outer peripheral portion of which is clamped between cover plate 67 and the remainder of the casing to form a sealed joint. By changing the setting of screw 82, the force with which the plug is normally urged into its seat can be adjusted.

To introduce lubricant under pressure into the valve, operating shaft 68 is shown provided with an axial threaded bore 84, in which the pressure screw 86 is threaded. A duct 87 serves to connect the inner end of bore 84 with the primary or jacking chamber 63 at the small end of the plug. A suitable check valve 88 is also interposed in bore 84 to prevent back flow of lubricant. In order to distribute lubricant to the valve working surfaces, the periphery of plug 61 is provided with four longitudinal lubricant channels 89 and 91, which are spaced substantially 90° apart as shown in Fig. 11. The ends of longitudinal channels 89 and 91 terminate short of the upper and lower edges of the valve working surfaces. The ends of channels 89 adjacent the large end of the plug are connected by a transverse arcuate channel 92, while the corresponding ends of longitudinal channels 91 are connected by a transverse arcuate channel 93. To establish communication between the other ends of longitudinal channels 89 and 91, and the chamber 63 in the small end of the plug, for open and closed positions of the valve, four stub or branch channels 94 are formed in the valve casing.

Assuming that a sufficient amount of viscous lubricant is introduced by way of bore 84, to completely fill chamber 63 at the small end of the plug, introduction of further lubricant by turning down screw 86 causes lubricant to flow through longitudinal channels 89 and 91, and transverse arcuate channels 92 and 93. By further turning down screw 86, a sufficiently high lubricant pressure can be attained in chamber 63 to hydraulically jack the plug from its seat, even though the plug may have become stuck or fast with respect to the casing. Jacking movement of the plug is accommodated by a slight amount of deformation of cover plate 67, within its elastic limit. During the jacking operation lubricant is extruded between the valve working surfaces from the lubricant channels, to provide adequate sealing when the plug again returns into its seat. A certain amount of viscous lubricant extruding from the lubricant channels in the valve working surfaces, finds its way into secondary lubricant chamber 64 at the large end of the plug. Lubrication at this point is advantageous not only to lubricate thrust bearing 78 but also to protect these parts from corrosive line fluids.

Formed in the large end of plug 61, there is a port 96 which connects the hole 97 in the plug, with the chamber 64. Flow of fluid through this port is controlled by chack valve 97, which can be similar to the check valve 57 previously described with reference to Figs. 1 to 6 inclusive. Check valve 97 operates in substantially the same manner as the check valve 57 previously described, in that it enables venting of trapped pressure in chamber 64, and it can also serve to permit escapement of lubricant in the event that too great a quantity is supplied to chamber 64.

I claim:

1. In a valve of the plug type, a casing having a passageway therethrough for flow of fluid and having a seat or bore formed transversely of the passageway, a plug disposed within said bore and having a hole adapted to register with the passageway for open position of the valve, a pressure lubricating system for said valve serving as means for effecting longitudinal jacking movement of the plug with respect to the casing and also serving to supply lubricant to the valve working surfaces, said system including a lubricant chamber formed at one end of the plug, said plug being formed with a port connecting said chamber with said hole, and a check valve serving to permit flow of fluid from said chamber through said port only when the pressure in said chamber is substantially in excess of the valve line pressure.

2. In a valve of the plug type, a valve casing having a passageway therethrough for flow of fluid and having a tapered seat formed transversely of the passageway, a tapered plug rotatably disposed within said seat, a pressure lubricating system for said valve serving as means for effecting longitudinal jacking movement of the plug from its seat and also serving to supply lubricant to the valve working surfaces, said system including a lubricant chamber formed at the large end of the plug within the casing, and means serving to permit venting of trapped fluid pressure from said chamber to the valve line.

3. In a valve of the plug type, a valve casing having a passageway therethrough for flow of fluid and having a tapered seat formed transversely of the passageway, a tapered plug rotatably disposed within said seat and having a hole adapted to register with the passageway for open position of the valve, a pressure lubricating system for said valve serving as means for effecting longitudinal jacking movement of the plug from its seat and also serving to supply lubricant to the valve working surfaces, said system including a lubricant chamber formed at the large end of the plug within the casing, said plug being formed to provide a port connecting said chamber with the hole in the plug, and a check valve serving to permit flow of fluid from said chamber through said port only when the pressure in said chamber is substantially in excess of the line pressure.

4. In a valve of the plug type, a casing having a passageway therethrough for flow of fluid and also having a tapered seat formed transversely of the passageway, a tapered valve plug rotatably disposed within said seat, a pressure lubricating system for said valve serving as means for effecting longitudinal jacking movement of the plug from its seat and also serving to supply lubricant to the valve working surfaces, said system including lubricant chambers formed at both ends of the plug, and means for permitting escapement of fluid from said chamber at the large end of the plug to the valve line.

5. In a valve of the rotary plug type, a casing having a passageway therethrough for flow of fluid and also having a tapered seat formed transversely of the passageway, a tapered valve plug rotatably disposed within said seat and having a hole adapted to register with the passageway for open position of the valve, a pressure lubricating system for said valve serving as means for effecting longitudinal jacking movement of the plug from its seat and also serving to supply lubricant to the valve working surfaces, said system including lubricant chambers formed at both ends of the plug, the chamber at the large end of the plug being in communication with the remainder of said system through a pressure attenuating duct whereby sufficient lubricant pressure can be attained in the other of said chambers to effect longitudinal jacking, said plug being provided with a port connecting the chamber at the large end of the plug with said hole in the plug and a check valve serving to permit flow of fluid from said chamber at the large end of the plug through said port only when the pressure in said last named chamber is substantially in excess of the line pressure, whereby the entrapment of relatively high pressure in said last mentioned chamber is prevented.

6. In a valve of the plug type, a valve casing having a passageway therethrough for flow of fluid and having a tapered seat formed transversely of the passageway, a tapered plug rotatably disposed within said seat, a cover for closing the casing at one end of the seat, a hollow member extending through the cover and having a shoulder thereon bearing against one face of the cover, a resilient member bearing against the plug, a nonyielding bearing member on said resilient member, and an adjustment member coacting with said bearing member and hollow member for adjusting the pressure of the shoulder against the cover; and means for introducing a plastic sealing lubricant around said shoulder.

7. In a valve of the plug type, a valve casing having a passageway therethrough for flow of fluid and having a tapered seat formed transversely of the passageway, a tapered plug rotatably disposed within said seat, a cover for closing the casing at one end of the seat, a hollow member extending through the cover and having a shoulder thereon bearing against one face of the cover, a resilient member bearing against the plug, a nonyielding bearing member on said resilient member, and an adjustment member coacting with said bearing member and hollow member for adjusting the pressure of the shoulder against the cover; a hollow lubricating member extending through said adjustment member communicating with a longitudinal lubricant passage through said plug, the valve having lubricant grooves in its seating surface and having communication between the longitudinal lubricant passage and lubricant grooves, and said lubricating grooves communicating above the plug to provide a lubricant seal about said shoulder.

8. In a plug valve, a casing having a passageway therethrough for flow of fluid and having a bore formed transversely of the passageway, a plug disposed in said bore and having a hole adapted to register with the passageway for open position of the valve, an operating stem extending into said casing for operating said valve, a pressure lubrication system for said valve for sealing and lubricating the valve working surfaces including a lubricant chamber for preventing the escape of fluid past said stem, and means in constant communication with said lubricant chamber for relieving pressure in the lubricating system in excess of a predetermined value to prevent locking of the plug against its seat.

SVEN JOHAN NORDSTROM.